Oct. 10, 1967 — H. FOLKERTS — 3,346,273
TRACTION HITCH
Filed Aug. 10, 1965 — 2 Sheets-Sheet 1
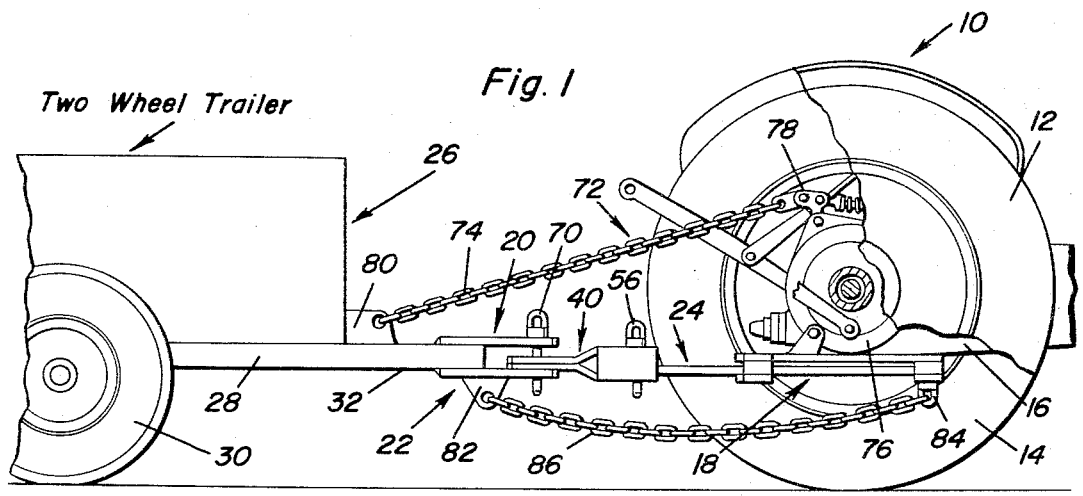
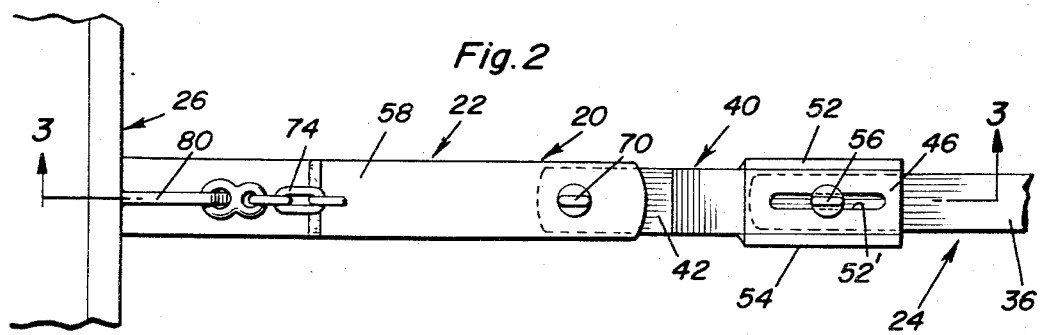
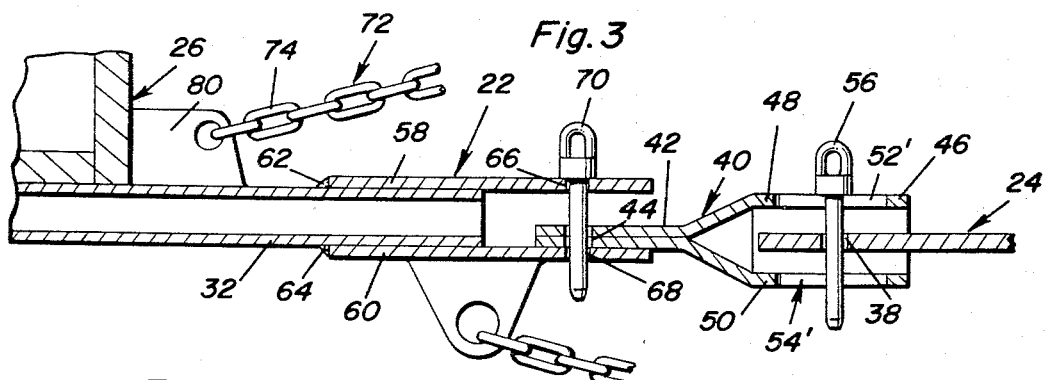
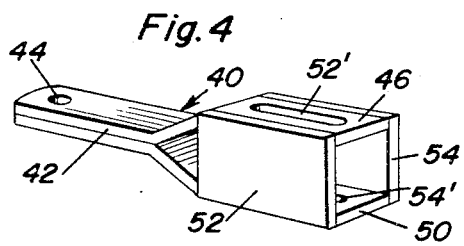
Henry Folkerts
INVENTOR.

Oct. 10, 1967 H. FOLKERTS 3,346,273
TRACTION HITCH
Filed Aug. 10, 1965 2 Sheets-Sheet 2
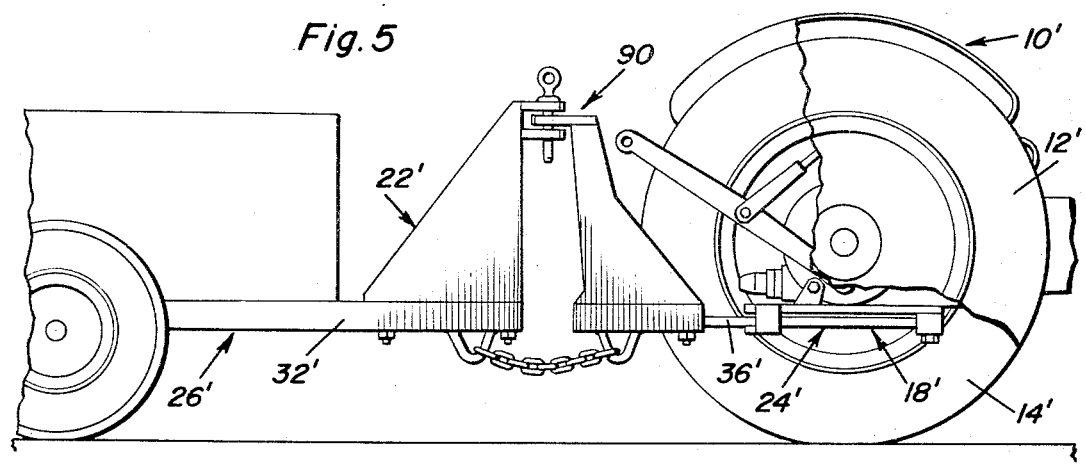
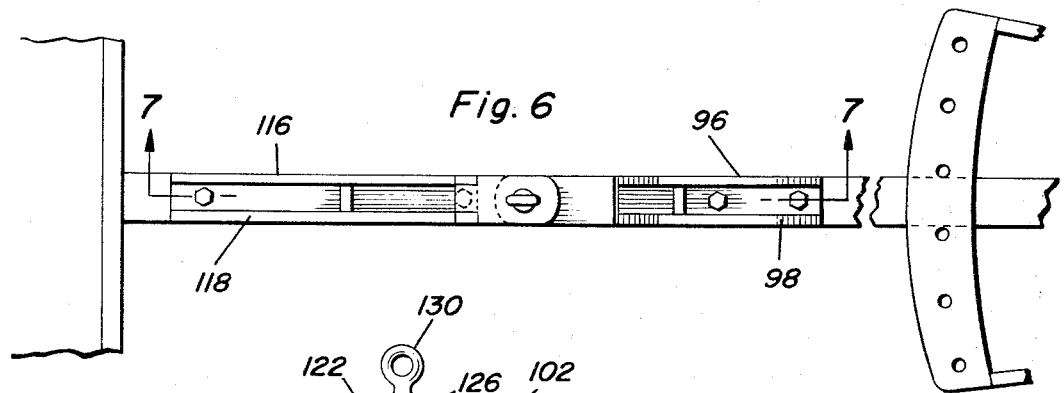
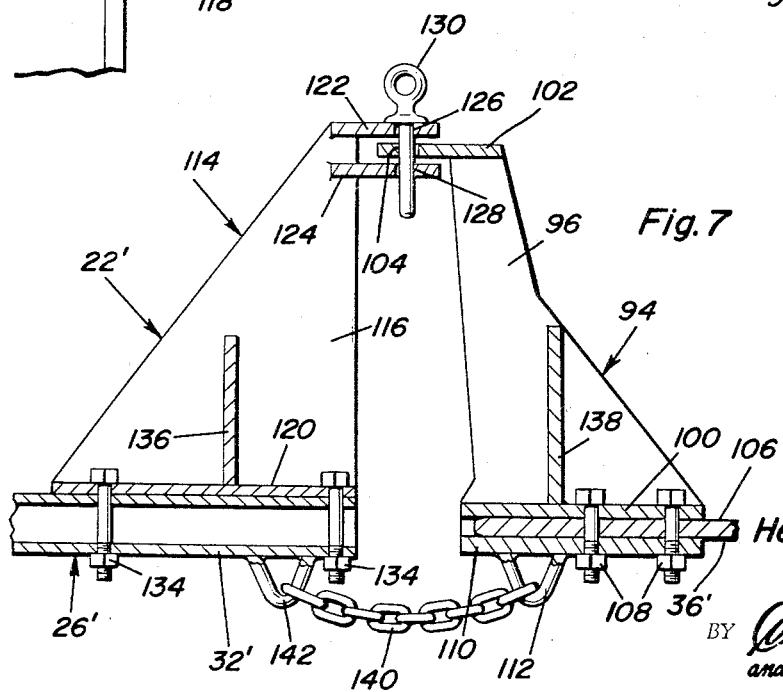
Henry Folkerts
INVENTOR.
BY Clarence A. O'Brien
and Harvey B. Jacobson
Attorneys United States Patent Office 3,346,273
Patented Oct. 10, 1967

3,346,273
TRACTION HITCH
Henry Folkerts, Prosser, Wash.
(Rte. 1, Outlook, Wash. 98938)
Filed Aug. 10, 1965, Ser. No. 478,647
8 Claims. (Cl. 280—457)

ABSTRACT OF THE DISCLOSURE

A traction hitch for towing a trailer including a forwardly projecting steering and towing tongue behind a tractor including rear driving wheels and including means operative to define a pivot connection between the trailer tongue and the tractor for relative angular displacement of the tractor and trailer about an upstanding axis adjacent the forward end of the tongue and disposed rearwardly of the rearmost extremities of the rear driving wheels of the tractor, a thrust connection between the trailer tongue and a point on said tractor disposed above a horizontal plane containing said axis, and a lost motion supplemental thrust connection between a lower forward portion of said trailer tongue and a point on said tractor below said plane inoperative to transfer thrust from said tractor to said trailer when said tractor and trailer are in horizontally disposed positions but operative to transfer thrust from said tractor to said trailer in lieu of the first mentioned thrust connection upon predetermined displacement of said tractor relative to said trailer about said axes from a horizontally disposed position of said tractor in a direction raising the front of the tractor.

This invention relates to a novel and useful traction hitch and more specifically to a hitch adapted to be secured to the rear of a farm tractor or the like and utilized to pull farm equipment.

The traction hitch of the instant invention is constructed in a manner whereby a heavy load being pulled by the hitch will transfer some of the weight of the associated farm tractor normally supported by the front wheels of the tractor to the rear driving wheels of the tractor thereby affording greater traction for the tractor.

The hitch of the instant invention includes first and second sections adapted to be rigidly secured to the tractor and farm implement, respectively, and which are pivotally secured together in a manner defining a vertical pivot axis for relative rotation of the first and second sections. In addition, means is provided, independently of the pivot axis defining means, for transferring the forward pull of the associated tractor from a point spaced appreciably above the first section to the farm implement to which the second section is secured.

The main object of this invention is to provide an improved traction hitch for farm use including means by which an operative connection between a tractor and a wheeled farm implement or the like may be defined in a manner such that a forward pull on the farm implement by the associated tractor will cause portions of the weight of the tractor normally supported by the front wheels of the tractor to be transferred to the rear driving wheels of the tractor thereby improving the traction afforded the tractor on its supporting surface.

A further object of this invention is to provide a traction hitch in accordance with the preceding object and which will be readily adaptable to being mounted on and operatively connected with substantially all types of farm tractors and implements.

A final object of this invention to be specifically enumerated herein is to provide a traction hitch in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a farm tractor and wheeled farm implement combination illustrated with one embodiment of the traction hitch operatively connected between the tractor and wheeled implement and with portions of the tractor being broken away and shown in vertical section;

FIGURE 2 is a fragmentary enlarged top plan view of the traction hitch illustrated in FIGURE 1 with portions of the hitch being broken away;

FIGURE 3 is a fragmentary longitudinal vertical sectional view taken substantially upon the plane indicated by the section line 3—3 of FIGURE 2;

FIGURE 4 is a perspective view of one section of the traction hitch illustrated in FIGURES 1–3;

FIGURE 5 is a fragmentary side elevational view similar to FIGURE 1 but showing a second embodiment of the traction hitch of the instant invention;

FIGURE 6 is a fragmentary top plan view of the traction hitch illustrated in FIGURE 5 and illustrating the traction hitch on somewhat of an enlarged scale; and FIGURE 7 is a fragmentary longitudinal vertical sectional view taken substantially upon the plane indicated by the section line 7—7 of FIGURE 6.

Referring now more specifically to the drawings, the numeral 10 generally designates a tractor including large diameter rear driving wheels 12 and 14. It is of course to be understood that the tractor 10 includes front steerable wheels (not shown) and that the rear wheels 12 and 14 are the driving wheels for the tractor 10.

A rear end and transmission casing 16 carried at the rear end of the tractor 10 and has a mounting frame generally referred to by the reference numeral 18 mounted thereon.

The traction hitch of the instant invention is generally referred to by the reference numeral 20 and the mounting frame 18 comprises a part thereof. The traction hitch 20 comprises a rear section generally referred to by the reference numeral 22 and a front section generally referred to by the reference numeral 24.

A two-wheeled farm trailer generally referred to by the reference numeral 26 is illustrated and includes a main frame 28 from which a pair of ground-engaging support wheels 30 are journaled. The frame 28 includes a forwardly projecting tongue portion 32, the rear section 22 being supported from the tongue portion 32 and the front section 24 being supported from the frame 18.

The front section 24 includes a forwardly projecting generally horizontally disposed bar 36 apertured as at 38. In addition, the front section 24 includes a link assembly generally referred to by the reference numeral 40 including a bar-like rear end 42 apertured as at 44. The front end of the link assembly 40 defines a generally rectangular and horizontally disposed sleeve 46 including top and bottom walls 48 and 50 interconnected by means of upstanding opposite side walls 52 and 54. The top and bottom walls 48 and 50 are longitudinally slotted as at 52' and 54', respectively, and the aperture 38 is registrable with the slots 52' and 54'. A removable locking pin 56 is passed through the slots 52' and 54' and the aperture 38 and the rear section 22 comprises a pair of upper and lower horizontal plates 58 and 60 secured to the upper and lower surfaces of the tongue portion 32 in any convenient manner such as by welding 62 and 64. The plates 58 and 60 project forwardly of the forward end of the tongue portion 32 and are apertured as at 66 and 68, a pivot pin 70 being passed through the apertures 66, 68 and 44.

A load transferring tension assembly generally referred to by the reference numeral 72 is additionally provided and comprises an elongated flexible chain member 74 having one end anchored to an upper portion of the differential and transmission case 76 as at 78 and the other end anchored to the tongue portion 32 by means of an anchor member 80 secured to an upper portion of the tongue portion 32 in any convenient manner. Still further, the plate 60 has an anchor member 82 dependingly supported therefrom and a still further anchor member 84 is dependingly supported from the forward end of the frame 18. An elongated and flexible tension member in the form of a length of chain 86 has its rear end secured to the anchor 82 and its forward end secured to the anchor member 84.

In operation, the pivot pin 70 defines the pivotal connection between the tractor 10 and the trailer 26 and the chain 74 comprises the pulling connection between the tractor 10 and the trailer 26. Inasmuch as the forward end of the chain 74 is secured to an upper portion of the differential and transmission casing 76, a forward pull on the trailer 26 by the tractor 10 results in a portion of the weight of the tractor 10 normally supported by the front wheels (not shown) thereof being transferred to the rear wheels 12 and 14 of the tractor 10 inasmuch as the point of connection of the chain 74 to the transmission and differential casing 76 is disposed above a horizontal plane containing the axes of rotation of the wheels 12 and 14.

The pin and slot connection defined by the pin 56 and the slots 52' and 54' compensates for angular displacement of the tractor 10 about a horizontal transverse axis relative to the trailer 26 and the chain 86 comprises a safety chain.

With attention now directed more specifically to FIGURES 5–7 of the drawings there will be seen a further embodiment of the traction hitch of the instant invention generally designated by the reference numeral 90. The traction hitch 90 includes a rear section generally referred to by the reference numeral 22' and a front section generally referred to by the reference numeral 24'. The front section 24' includes a mounting frame 18' which is similar to the mounting frame 18 and includes a rearwardly projecting bar 36' corresponding to the bar 36.

The front section 24' includes a first upstanding thrust transfer assembly generally referred to by the reference numeral 94 and which includes a pair of upstanding opposite side plates 96 and 98 rigidly interconnected at their lower ends by means of a bottom wall or plate 100 and also rigidly interconnected at their upper ends by means of a rigid top plate 102. The rigid top plate 102 projects rearwardly of the rear ends of the opposite side plates 96 and 98 and is apertured as at 104. The bottom plate 100 is secured to the upper surface 106 of the bar 36' by means of a pair of fasteners 108 secured through the bottom plate, the bar 36' and a backing plate 110 disposed beneath the rear end of the bar 36' and which includes a depending anchor 112.

The rear section 22' includes a second or rear upstanding thrust transferring assembly generally referred to by the reference numeral 114. The assembly 114 includes a pair of opposite side upstanding plates 116 and 118 interconnected at their lower ends by means of a bottom plate 120 and at their upper ends by means of a pair of vertically spaced upper plates 122 and 124 which project forwardly of the forward ends of the plates 116 and 118 and are apertured as at 126 and 128. The apertures 104, 126 and 128 are registrable with each other with the top plate 102 received between the plates 122 and 124 and a thrust transfer pin 130 is passed through the aligned apertures 104, 126 and 128.

The assembly 114 is secured to the forward end of the tongue portion 32' of a trailer generally referred to by the reference numeral 26' by means of suitable fasteners 134 secured through the bottom plate 120 and the tongue portion 32'. In addition, a buttress plate 136 is secured between lower portions of the plates 116 and 118 and the bottom plate 120. Further, a buttress plate 138 is secured between the opopsite side plates 96 and 98 and the bottom plate 100.

An elongated flexible chain 140 has its forward end secured to the anchor 112 and its rear end secured to an anchor 142 dependingly supported from the tongue portion 32'. The chain 140 comprises means for defining an articulate connection between the tractor 10' and the trailer 26' for angular displacement of the latter generally about a vertical axis relative to the former and with such pivot axis of the floating type and therefore similar to the pivot axis defined between the tractor 10 and the trailer 26 by means of the pin 70 and the pin 56 in the slots 52' and 54'.

In operation, a forward pull effected on the trailer 26' by the tractor 10' is transferred from a point on the tractor 10' disposed above the horizontal plane containing the axes of rotation of the rear drive wheels 12' and 14' of the tractor 10' and therefore transfers a certain portion of the weight of the tractor 10' normally carried by the front wheels (not shown) thereof to the rear driving wheels 12' and 14'. Accordingly, it may be seen that the traction hitches 20 and 90 operate in a similar manner and that each serves to increase the traction of the associated tractor.

What is claimed as new is as follows:

1. In combination, a farm tractor including rear driving wheels journaled for rotation about horizontal transverse axes, a trailer including a forwardly projecting steering and towing tongue, and a traction hitch assembly connected between said tractor and said trailer defining a pivot connection between said tongue and said tractor for relative angular displacement of said tractor and trailer about an upstanding axis adjacent the forward end of said tongue and disposed rearward of the rearmost extremities of the rear wheels, a thrust connection between said trailer tongue and a point on said tractor disposed appreciably above a horizontal plane containing said axes, and a lost motion supplemental thrust connection between a lower forward portion of said trailer tongue and a point on said tractor below said plane inoperative to transfer thrust from said tractor to said trailer when said tractor and trailer are in horizontally disposed positions but operative to transfer thrust from said tractor to said trailer in lieu of the first mentioned thrust connection upon predetermined displacement of said tractor relative to said trailer tongue about said axes from said horizontally disposed position in a direction raising the front of said tractor.

2. The combination of claim 1 wherein said thrust connection includes an elongated flexible tension member, one end of said tension member being secured to said point on said tractor and the other end of said tension member being secured to said tongue rearwardly of the forward end thereof, said lost motion supplemental thrust connection including a connection between said tractor and said tongue forward of the point of connection of said tension member to said tongue.

3. The combination of claim 2 wherein said pivot connection includes means defining a floating pivot axis shiftable longitudinally of said tongue between two limit positions spaced longitudinally of said tongue.

4. The combination of claim 1 wherein said pivot connection includes means defining a floating pivot axis shiftable longitudinally of said tongue between two limit positions spaced longitudinally of said tongue.

5. The combination of claim 1 wherein said pivot connection defines said thrust connection.

6. The combination of claim 1 wherein the point of connection of said lost motion supplemental thrust connection to said tractor is also disposed rearwardly of the rearmost extremities of said rear wheels.

7. The combination of claim 1 wherein said lost motion connection includes an elongated flexible tension member connected between said tongue and said tractor.

8. In combination, a tractor including rear driving wheels journaled for rotation about horizontal transverse axes, a trailer including a forwardly projecting steering and towing tongue, and a traction hitch assembly connected between said tractor and said trailer defining a pivot connection between said tongue and said tractor for relative angular displacement of said tractor and trailer about an upstanding axis adjacent the forward end of said tongue and disposed rearward of the rearmost extremities of the rear wheels a thrust connection between said trailer tongue and a point on said tractor disposed above a horizontal plane containing said axes, a lost motion supplemental thrust connection between a lower forward portion of said trailer tongue and a point on said tractor below said plane inoperative to transfer thrust from said tractor to said trailer when said tractor and trailer are in horizontally disposed positions but operative to transfer thrust from said tractor to said trailer in lieu of the first mentioned thrust connection upon predetermined displacement of said tractor relative to said trailer tongue about said axes from said horizontally disposed position in a direction raising the front of said tractor, said pivot connection being defined by horizontally overlapping portions of an upstanding portion of the forward end of said tongue and an upstanding portion carried by the rear end portion of a rearwardly projecting frame attached to said tractor below said plane and a pivot pin passed through said overlapped portions.

References Cited

UNITED STATES PATENTS

| | | | |
|---|---|---|---|
| 1,481,376 | 1/1924 | Klein | 280—461 |
| 2,650,101 | 8/1953 | Frankfother | 280—457 |
| 2,691,533 | 10/1954 | Koontz | 280—432 X |
| 2,872,212 | 2/1959 | Hume | 280—432 X |
| 3,010,735 | 11/1961 | Larsen | 280—405 |
| 3,128,107 | 4/1964 | Miller et al. | 280—457 |

FOREIGN PATENTS

| | | |
|---|---|---|
| 65,992 | 12/1955 | France. |
| 587,442 | 1/1959 | Italy. |

LEO FRIAGLIA, *Primary Examiner.*